(12) United States Patent
Scheps

(10) Patent No.: US 6,259,560 B1
(45) Date of Patent: Jul. 10, 2001

(54) CONTINUOUSLY VARIABLE BEAM COMBINER

(75) Inventor: Richard Scheps, Rancho Santa Fe, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/293,306

(22) Filed: Apr. 16, 1999

(51) Int. Cl.$^7$ .......................................... G02B 5/30
(52) U.S. Cl. .................... 359/485; 359/495; 359/496; 359/497; 359/122; 359/618; 359/629
(58) Field of Search ................... 359/484, 487, 359/494, 495, 496, 497, 117, 122, 123, 124, 127, 129, 485, 629, 636, 634, 618

(56) References Cited

U.S. PATENT DOCUMENTS

| | | |
|---|---|---|
| 3,501,640 | 3/1970 | Harris . |
| 4,256,962 | 3/1981 | Horton et al. . |
| 4,266,854 | 5/1981 | Avicola . |
| 4,288,691 | 9/1981 | Horton . |
| 4,474,424 | 10/1984 | Wagner . |
| 4,483,582 | 11/1984 | Sheem . |
| 4,530,600 * | 7/1985 | Lopez . |
| 4,566,761 | 1/1986 | Carlsen et al. . |
| 4,588,262 * | 5/1986 | Nelson . |
| 4,613,206 | 9/1986 | Franchetti et al. . |
| 4,694,447 | 9/1987 | Cohen et al. . |
| 4,707,064 | 11/1987 | Dobrowolski et al. . |
| 4,728,965 | 3/1988 | Kessler et al. . |
| 4,744,075 | 5/1988 | Buhrer . |
| 4,796,263 | 1/1989 | Rampolla . |
| 4,800,556 * | 1/1989 | Charlier et al. . |
| 4,805,977 * | 2/1989 | Tamura et al. . |
| 4,823,357 | 4/1989 | Casey . |
| 4,944,573 | 7/1990 | Michon . |
| 4,946,567 | 8/1990 | Michon et al. . |
| 4,976,527 | 12/1990 | Horikawa et al. . |
| 4,978,197 | 12/1990 | Horikawa . |
| 4,986,634 | 1/1991 | Horikawa et al. . |
| 4,989,076 * | 1/1991 | Owada et al. .................... 359/497 |
| 5,036,512 | 7/1991 | Cloonan et al. . |
| 5,048,911 | 9/1991 | Sang et al. . |
| 5,086,349 | 2/1992 | Okayama et al. . |
| 5,119,454 | 6/1992 | McMahon . |
| 5,179,462 | 1/1993 | Kageyama et al. . |
| 5,210,643 | 5/1993 | Fugii et al. . |
| 5,212,594 * | 5/1993 | Joynes .............................. 359/495 |
| 5,223,975 * | 6/1993 | Naganuma et al. .............. 359/487 |
| 5,268,787 * | 12/1993 | McIntyre . |
| 5,537,258 | 7/1996 | Yamazaki et al. . |
| 5,625,490 * | 4/1997 | Coult et al. ...................... 359/484 |
| 5,680,237 | 10/1997 | Cheng . |
| 5,692,226 * | 11/1997 | Hall . |

FOREIGN PATENT DOCUMENTS

0282824 * 12/1986 (JP) ................................. 359/495

* cited by examiner

Primary Examiner—Ricky D. Shafer
(74) Attorney, Agent, or Firm—Harvey Fendelman; Peter A. Lipovsky; Eric James Whitesell

(57) ABSTRACT

A continuously variable beam combiner combines multiple input beams of different wavelengths into a single output beam in which the power of each input beam may be varied continuously.

17 Claims, 3 Drawing Sheets

CONTINUOUSLY VARIABLE BEAM COMBINER

LICENSING INFORMATION

The invention described below is assigned to the United States Government and is available for licensing commercially. Technical and licensing inquiries may be directed to Harvey Fendelman, Patent Counsel, Space and Naval Warfare Systems Center San Diego, Code D0012 Rm 103, 53510 Silvergate Avenue, San Diego, CA 92152; telephone no. (619) 553-3001; fax no. (619) 553-3821.

BACKGROUND OF THE INVENTION

The present invention relates generally to multiple laser beam devices. More specifically, but without limitation thereto, the present invention relates to a beam combiner for multiple lasers.

Generally, laser beam combiners do not provide for varying each laser beam in a continuous fashion, i.e. only a fixed fraction of each laser beam is combined to generate a composite beam.

Applications such as displaying colors often require a combination of red, green, and blue light mixed in different proportions. A need therefore exists for a laser beam combiner in which the proportion of each beam may be varied continuously.

SUMMARY OF THE INVENTION

The present invention is directed to overcoming the problems described above and may provide further related advantages. No embodiment of the present invention described herein shall preclude other embodiments or advantages that may exist or become obvious to those skilled in the art.

A continuously variable beam combiner of the present invention combines multiple input beams of different wavelengths into a single output beam in which the power of each input beam may be varied continuously.

An advantage of the continuously variable beam combiner of the present invention is that a continuous spectrum of colors may be generated in a single collimated beam.

Another advantage is that the power of several beams may be combined into a single collimated beam.

The features and advantages summarized above in addition to other aspects of the present invention will become more apparent from the description, presented in conjunction with the following drawings.

DESCRIPTION OF THE INVENTION

The following description is presented solely for the purpose of disclosing how the present invention may be made and used. The scope of the invention is defined by the claims.

Figure 1:
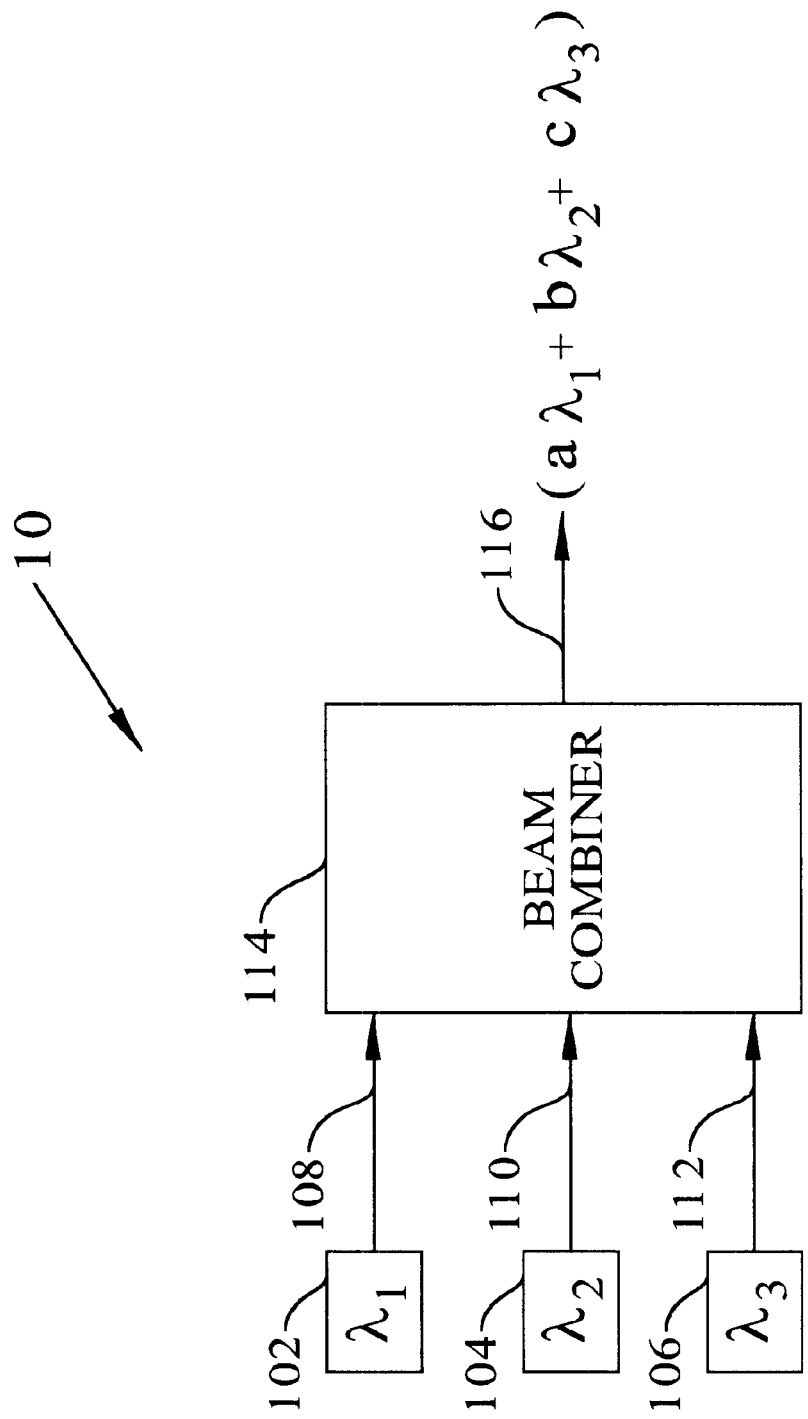
FIG. 1 is a functional diagram of a continuously variable beam combiner of the present invention.

FIG. 1 is a functional diagram of a continuously variable beam combiner configuration 10 of the present invention for combining three input beams 108, 110, and 112 into a single collimated output beam 116. Input beams 108, 110, and 112 may be generated by, for example, lasers 102, 104, and 106 at wavelengths of $\lambda_1$, $\lambda_2$, and $\lambda_3$ respectively. Beam combiner 114 combines input laser beams 108, 110, and 112 into a single collimated output beam 116. Output beam 116 contains wavelengths $\lambda_1$, $\lambda_2$, and $\lambda_3$ at relative power levels that are represented by coefficients a, b, and c respectively. Coefficients a, b, and c may be varied individually by beam combiner 114 to control the proportion of each of input beams 108, 110, and 112 in output beam 116. If input beams 108, 110, and 112 have different wavelengths, the coefficients a, b, and c determine the color of output beam 116. For example, if wavelengths $\lambda_1$, $\lambda_2$, and $\lambda_3$ are selected as red, green, and blue, then the color of output beam 116 may be varied continuously over the visible spectrum by selecting the appropriate power level coefficients a, b, and c.

Figure 2:
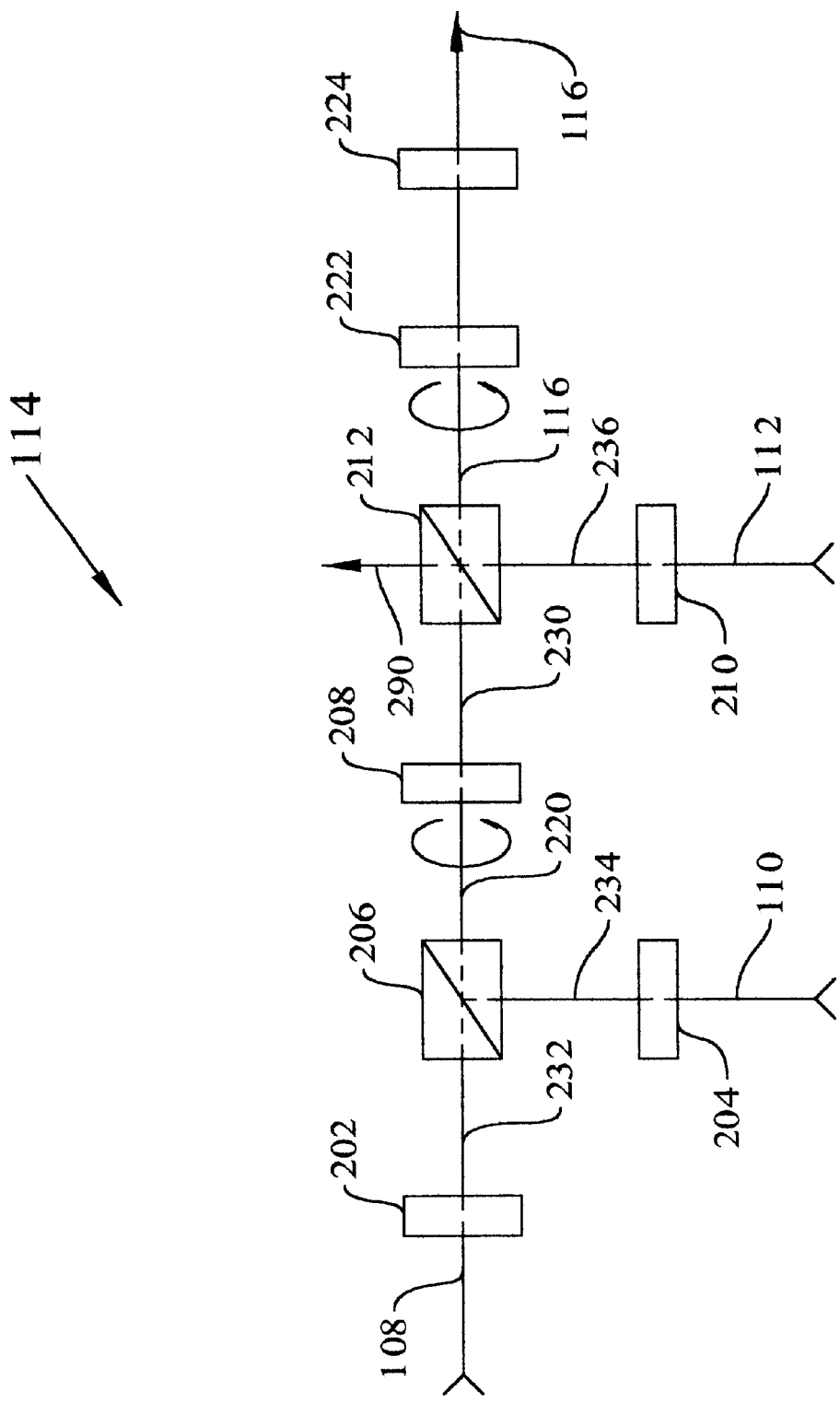
FIG. 2 is a diagram of an exemplary continuously variable beam combiner of the present invention.

FIG. 2 is a diagram of an exemplary continuously variable beam combiner 114 of the present invention. A first linear polarizer 202 polarizes first input beam 108 so that a horizontally polarized portion 232 of the energy in input beam 108 is transmitted through polarizing beam combiner 206 along a common axis of output beam 116.

A second linear polarizer 204 polarizes second input beam 110 so that a vertically polarized portion 234 of the energy in input beam 110 is reflected within polarizing beam combiner 206 along the common axis of output beam 116. Polarizing beam combiner 206 combines the horizontally polarized portion 232 of first input beam 108 and the vertically polarized portion 234 of second input beam 110 to generate an intermediate beam 220 in which first input beam 108 is horizontally polarized and second input beam 110 is vertically polarized.

Figure 3:
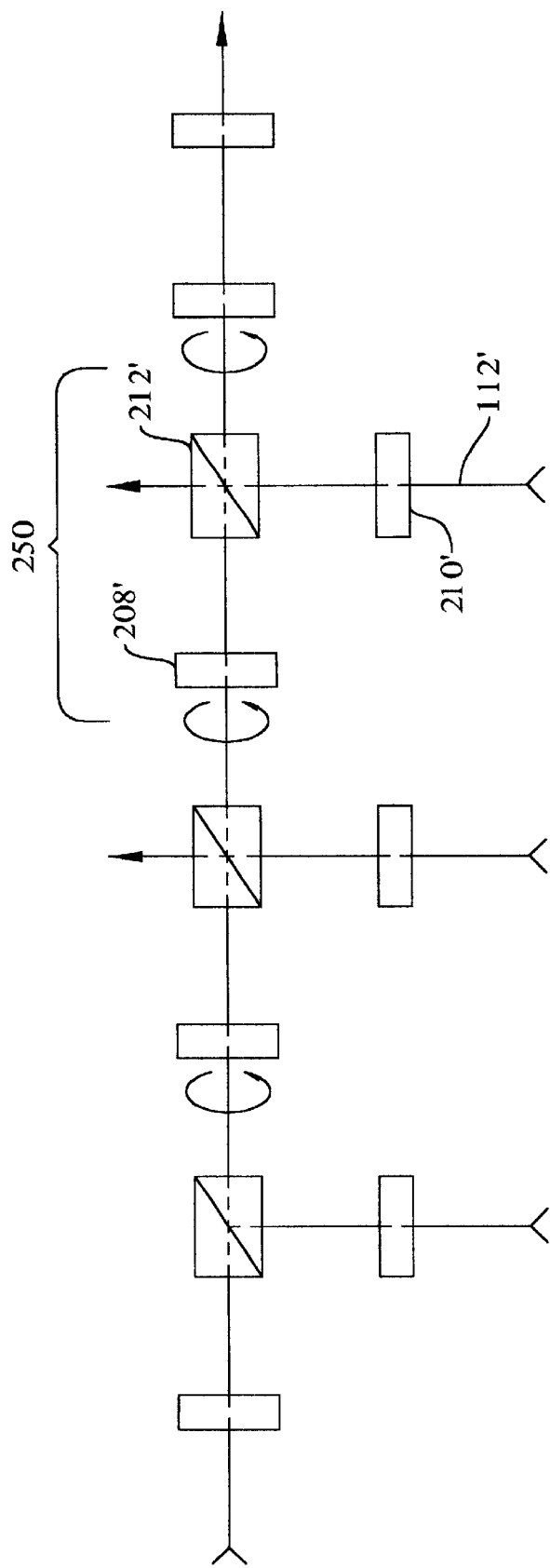
FIG. 3 is a diagram of an alternative exemplary continuously variable beam combiner of the present invention.

A half-wave plate 208 rotates the polarization orientation of portions 232 and 234 of intermediate beam 220 by an angle that may be selected by rotating half-wave plate 208 with respect to polarizing beam combiner 206 and produces second intermediate beam 230. The rotation of the polarization orientation of portions 232 and 234 of intermediate beam 220 varies the fraction of each of portions 232 and 234 that is transmitted as second intermediate beam 230 by second polarizing beam combiner 212. For example, if the polarization orientation of portions 232 and 234 of intermediate beam 220 is rotated by 45 degrees by half-wave plate 208, then about half of the power of portions 232 and 234 combined in intermediate beam 220 will be transmitted by polarizing beam combiner 212. In this case, about half the power will be reflected by polarizing beam combiner 212 to form reflected beam 290. Referring to FIG. 3, it can be seen that additional half-wave plate 208' and polarizing beam combiner 212' may be added as a unit 250 for each additional beam 112' incorporated into the invention. An optional linear polarizer 210' is shown with this additional combination.

Referring once again to FIG. 2, polarizing beam combiner 212 transmits the horizontally polarized portion of second intermediate beam 230 along the common axis of output beam 116, and reflects the vertically polarized portion of second intermediate beam 230. A third linear polarizer 210 polarizes third input beam 112 so that a vertically polarized portion 236 of the energy in input beam 112 is reflected within polarizing beam combiner 212 along the common axis of output beam 116. Polarizing beam combiner 212 combines the horizontally polarized portion of second intermediate beam 230 and the vertically polarized portion 236 of third input beam 112 to generate output beam 116.

Polarizing beam combiners 206 and 212 are well known and are available from optical components vendors. They may also be made by applying an appropriate coating to the hypotenuses of two right angle prisms and cementing them together. In this example, the polarizing beam combiners are designed to reflect vertically polarized light and transmit horizontally polarized light.

Alternatively, the polarizing beam combiners may be designed to reflect horizontally polarized light and transmit vertically polarized light, reversing the roles of horizontal and vertical polarization in the operation of the beam combiner of the present invention described above.

Half-wave plates 208 and 222 are well known optical components and may be made of crystalline quartz, for example.

Output beam 116 may be modified to have a single polarization orientation by adding a second half-wave plate 222 and a fourth linear polarizer 224 along the axis of output beam 116 as shown in FIG. 2.

Linear polarizers 202, 204, and 210 may not be needed if input beams 108, 110, and 112 are already linearly polarized. For example, if laser diodes are used as lasers 102, 104, and 106, then linear polarization is produced inherently by the operation of laser diodes.

Besides combining different wavelengths, beam combiner 114 may also be used to combine laser beams of different power. For example, one input beam source may have a relatively high power for aligning an optical resonator, and another input beam source may have a relatively low power output.

Beam combiner 114 may also be configured to utilize reflected beam 290 from polarizing beam combiner 212 in a direction that is orthogonal to output beam 116.

As shown in FIG. 3, additional sections 250 comprising a half-wave plate and a polarizing beam combiner may be added along output beam 116 for combining more than three beams.

Other modifications, variations, and applications of the present invention may be made in accordance with the above teachings other than as specifically described to practice the invention within the scope of the following claims.

I claim:

1. A continuously variable beam combiner comprising:
    a first polarizing beam combiner coupled to a horizontally polarized first input beam and to a vertically polarized second input beam for transmitting the first input beam along a common output beam axis and reflecting the second input beam along the common output beam axis to form a first intermediate beam;
    a first half-wave plate coupled to the first polarizing beam combiner for rotating the polarization orientation of the first intermediate beam to produce a second intermediate beam wherein the first half-wave plate is rotated by a selected angle to vary continuously the proportion of the first input beam and the second input beam in the first intermediate beam; and
    a second polarizing beam combiner coupled to the first half-wave plate and to a vertically polarized third input beam for transmitting a horizontally polarized portion of the second intermediate beam along the common output beam axis and reflecting the vertically polarized third input beam along the common output beam axis to generate an output beam.

2. The continuously variable beam combiner of claim 1 further comprising a source of the first input beam, a source of the second input beam, and a source of the third input beam.

3. The continuously variable beam combiner of claim 2 wherein at least one input beam source has a low power output and at least one input beam source has a high power output.

4. The continuously variable beam combiner of claim 2 further comprising a linear polarizer coupled to one of the source of the first input beam, the source of the second input beam, and the source of the third input beam.

5. The continuously variable beam combiner of claim 2 wherein each input beam source for each input beam is a laser diode.

6. The continuously variable beam combiner of claim 1 further comprising a second half-wave plate coupled to the second polarizing beam combiner wherein the second half-wave plate is rotated by a selected angle to vary continuously the proportion of the second intermediate beam and the third input beam in the output beam;.

7. The continuously variable beam combiner of claim 6 further comprising a polarizer coupled to the second half wave plate.

8. The continuously variable beam combiner of claim 1 further comprising a section comprising an additional half-wave plate coupled to a preceding polarizing beam combiner, an additional polarizing beam combiner coupled to the additional half-wave plate, and an additional input beam coupled to the additional polarizing beam combiner.

9. The continuously variable beam combiner of claim 1 wherein a portion of the input beams is directed along an axis substantially orthogonal to the output beam axis.

10. The continuously variable beam combiner of claim 1 further comprising a linear polarizer coupled to the second halfwave plate for polarizing the output beam.

11. The continuously variable beam combiner of claim 1 further comprising a polarizer coupled to the first input beam for horizontally polarizing the first input beam.

12. The continuously variable beam combiner of claim 1 further comprising a polarizer coupled to the second input beam for vertically polarizing the second input beam.

13. A continuously variable beam combiner comprising:
    a first polarizing beam combiner coupled to a vertically polarized first input beam and to a horizontally polarized second input beam for transmitting the first input beam along a common output beam axis and reflecting the second input beam along the common output beam axis to form a first intermediate beam;
    a first half-wave plate coupled to the first polarizing beam combiner for rotating the polarization orientation of the first intermediate beam to produce a second intermediate beam wherein the first half-wave plate is rotated by a selected angle to vary continuously the proportion of the first input beam and the second input beam in the first intermediate beam; and
    a second polarizing beam combiner coupled to the first half-wave plate and to a horizontally polarized third input beam for transmitting a vertically polarized portion of the second intermediate beam along the common output beam axis and reflecting the horizontally polarized third input beam along the common output beam axis to generate an output beam.

14. The continuously variable beam combiner of claim 13 wherein a portion of the input beams is directed along an axis substantially orthogonal to the output beam axis.

15. The continuously variable beam combiner of claim 13 further comprising a linear polarizer coupled to the second half wave plate for polarizing the output beam.

16. The continuously variable beam combiner of claim 13 further comprising a polarizer coupled to the first input beam for vertically polarizing the first input beam.

17. The continuously variable beam combiner of claim 13 further comprising a polarizer coupled to the second input beam for horizontally polarizing the second input beam.

* * * * *